Patented Apr. 24, 1934

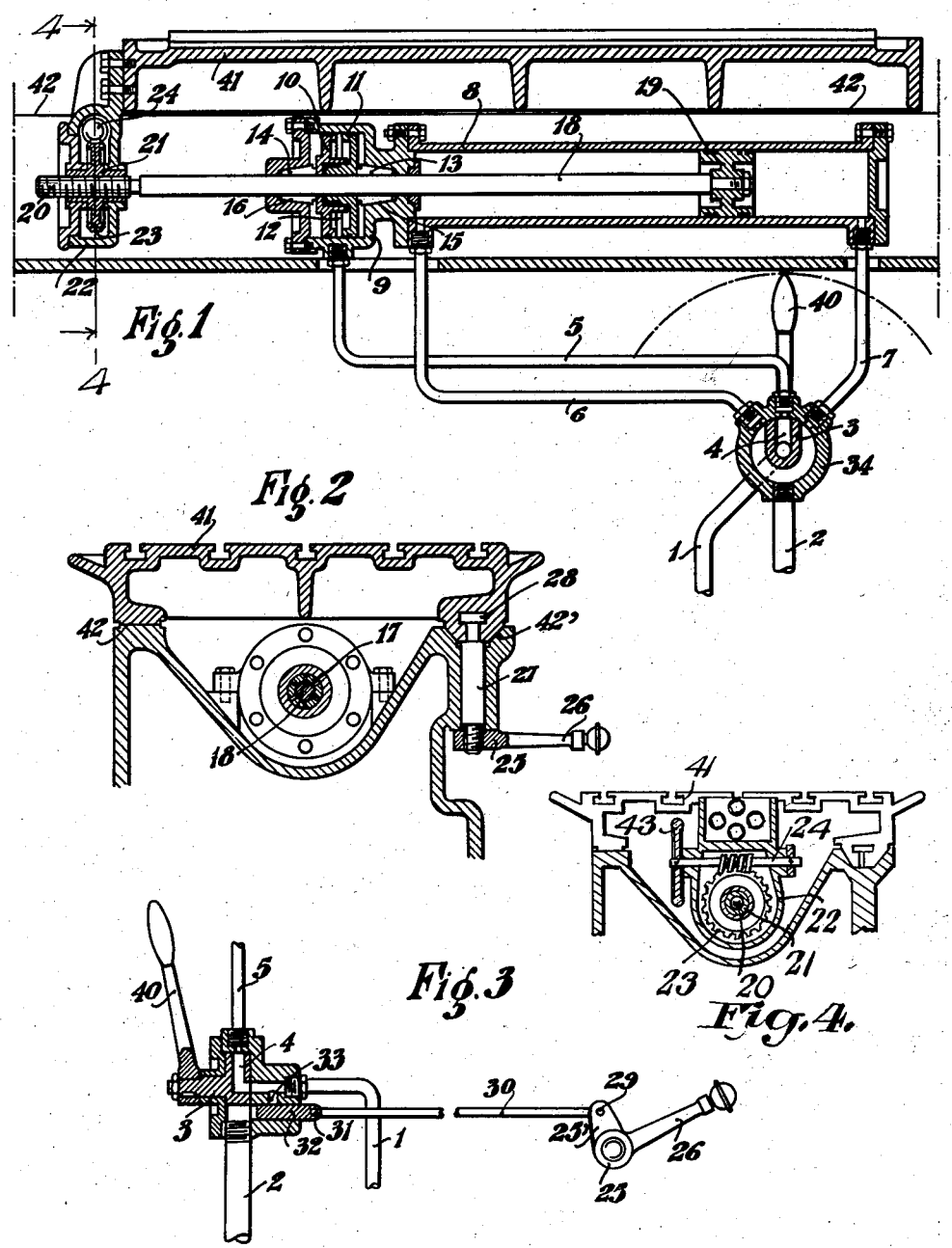

1,956,110

UNITED STATES PATENT OFFICE 1,956,110

MACHINE TOOL

Fernand Turrettini, Cologny, Switzerland, assignor to the firm Societe Genevoise D'Instruments De Physique, Geneva, Switzerland Application April 24, 1933, Serial No. 667,730
In Switzerland May 6, 1932

4 Claims. (Cl. 121—45)

This invention relates to pressure fluid operated machine tools and more particularly to machine tools having a pressure fluid propelled work table.

It is known in machine tools of this type to approximately position the work table by the action of fluid pressure on a piston movable in a cylinder and to adjust the table into its exact position by a manually operable fine adjustment device bearing upon the immobilized piston for moving the table.

The object of the present invention is to effect an increase in precision in the positioning of the table by providing locking means for rigidly securing the piston to the machine frame before operating the fine adjustment device.

A further object is to provide fluid pressure operated means for locking the piston, which means are preferably controlled by the same valve controlling the flow of fluid into the cylinder and in such a manner that upon actuation of the fluid pressure locking means, the pressure in the cylinder is evacuated on both sides of the piston.

A further object is the provision of a locking device for rigidly connecting the work table to the machine frame, the actuating member of this locking device being connected to a relief valve, which, upon locking the table, relieves pressure in the cylinder and in the hydraulic locking device for preventing any fluid pressure acting on the piston when the table is locked and which pressure would overstrain the fine adjustment device.

These and other objects and advantages will be apparent from the following description in connection with the accompanying drawing, in which, Figure 1 is a longitudinal section through the work support of a machine tool and the hydraulic propelling mechanism therefor;

Figure 2 is a transverse section;

Figure 3 shows the manual control means for the hydraulic mechanism.

Figure 4 is a section along the line 4—4 of Fig. 1.

According to Figs. 1 and 2, a work support or table 41 of a milling machine for example, is movable along rails 42, 42' of the frame of the machine. This work support can be brought into its approximate working position by means of a hydraulic propulsion mechanism comprising a cylinder 8 fixed beneath the work table to the frame of the machine and containing a reciprocable double acting piston 19 of which the piston rod 18 is operatively connected to the work table 41.

The liquid under pressure destined to actuate the piston 19 is delivered by a pump (not shown) through the feed pipe 1 into a distributor 34 and returns to this pump through the pipe 2. The distributor comprises a rotatable valve 3 which can be brought into different positions by means of a handle 40. The valve is provided with a port 4 which can establish communication between the pipe 1 and either of the conduits 5, 6 or 7. When the valve 3 is in its median position as represented in Fig. 1, liquid can pass into the conduit 5, while the conduits 6 and 7 leading to the two ends of the cylinder 8, communicate with the discharge conduit 2, and there is accordingly no pressure acting in the cylinder 8. This median position of the valve 3 corresponds thus to the position of rest of the hydraulic propulsion mechanism which moves the table. The operating handle 40 is therefore placed in its represented position after the work table has been moved approximatively to the desired position by the action of the liquid pressure in the cylinder, and the table will then be adjusted into its exact position by means of a manually operated mechanism.

The conduit 5 leads to a locking device for the piston 19. This device comprises a closed container 9 secured to the cylinder 8 and containing two pistons 10 and 11. The conduit 5 discharges into the space 12 provided between the two pistons 10 and 11. Each of the two pistons carries a conical extension 13 and 14 surrounding the rod 18. These extensions are divided by axial slots 17 (Fig. 2) into several segments, like an extensible mandrel, and may consequently be pressed strongly against the rod 18 and against the conical walls of the recesses 15 and 16 provided in the container 9, when the pressure of the liquid tends to drive the two pistons 10 and 11 away from each other. When the valve 3 thus establishes communication between the delivery pipe 1 and the conduit 5, the rod 18 and piston 19 are tightly locked in their position.

A screw thread 20 is provided on the extremity of the piston rod 18. A rotatable nut 21 is mounted on the threaded portion and is held against longitudinal movement relative to the table 41 by a casing 22 fixed to the table. The periphery of the nut is provided with a helicoidal toothing 23 meshing with a worm 24 which may be rotated by a hand wheel 43. When the worm is actuated, the nut 21 turns on the thread 20 of the rod 18 and as the latter is locked against movement by the action of the fluid pressure in the space 12, the table moves owing to manual action.

When the valve 3 is turned so that its port 4 establishes communication between the delivery pipe 1 and the conduit 6 or 7, the conduit 5 is brought into communication with the discharge 2. As the pressure decreases in the space 12, the cones 13 and 14 become loose and the piston rod 18 is unlocked and is free to move.

The liquid forced into the cylinder 8 by the conduit 6 for instance, moves the piston 19 towards the right hand side in Fig. 1, while the liquid which is expelled by the piston escapes freely through the conduit 7 into the discharge pipe 2, and the movement of the piston is transmitted to the table 41 by the intermediary of the wheel 21 and the casing 22.

When table 41 has been adjusted into the desired position, it may be locked to the rail 42' by means of a tie rod 27 provided with a screw threaded end carrying a nut 25. The rod 27 is provided with a head engaged in the groove 28 of the table and when the nut 25 is tightened by means of the handle 26, the table will be tightly locked on the rail 42'.

In order to prevent the hydraulic propelling mechanism from being actuated when the table 41 is locked on its rails a device is provided to render the distributor 34 inoperative when the nut 25 is tightened. The nut 25 carries a lug 25' (Fig. 3) to which is pivoted, at 29, one end of a rod 30, connected with its other end, at 31, to a slide valve 32. When the nut 25 is tightened the slide 32 moves towards the right in Fig. 3 and opens a port 33 establishing communication between the feed pipe 1 and the discharge 2. The pressure falls in the distributor whereby any driving action of the piston 19 by operating the handle 40 is prevented. In this case the manually operated adjusting device also is not operative, because no pressure being available the rod 18 cannot be locked by the cones 13 and 14.

Reciprocally when the handle 26 is loosened, the slide 32 covers the port 33 and the fluid pressure is reestablished in the valve 4, and can again act either on the piston 19 or on the locking device 10, 11, 13, 14.

The hydraulically propelled translation mechanism permits rapid approximative positioning of the work table, but it would not be sufficient for fine adjustment of the table because it operates too fast to stop the table at the exact place, and the machines to which it is intended to apply the described mechanism require an adjustment of the work table of which the precision must be of the order of one hundredth of a millimeter. It is not possible to adjust the flow of the liquid to the cylinder 8 to such a slow degree in order to obtain a sufficiently slow but continuous motion of the piston, that a precision as above mentioned can be obtained. The manually operated fine adjustment device however permits the final adjustment to be made with any desired precision.

It may be mentioned also, that owing to the elasticity of the walls of the conduits and of the cylinder containing the pressure fluid, as also owing to the compressibility, though extremely feeble of the liquid, small movements of the working piston and therefore of the table would be possible even after the hydraulically operated locking device for the piston rod has been put into action, particularly when the pressure acting on said walls is suddenly released, and would be prejudicial for the precision which may be obtained by the manually operated mechanism. This inconvenience is eliminated by the locking device formed by the rod 27 and nut 25 capable of rigidly connecting the work table to the frame of the machine, and by the provision of the rod 30 and slide valve 32 releasing the fluid pressure when the table is locked to the machine frame.

It will be apparent that the propelling fluid for the described mechanism may be constituted also by a gas under pressure.

I claim:

1. A machine tool having a frame, a pressure fluid propelled support movable along the frame, a pressure cylinder, a piston operable in the cylinder, a piston rod connected to the support for movement with the support and relative thereto, pressure fluid operated means for locking the piston against movement relative to the frame, manually actuated means for locking the support to the frame, a fluid distributor, a feed pipe admitting pressure fluid to the distributor, a discharge conduit connected to the distributor, conduits connecting the distributor to the cylinder and to said fluid operated locking means, and a by-pass valve operatively connected to said manually actuated locking means for the support whereby actuation thereof positively opens said by-pass valve to connect said feed pipe with the discharge conduit for relieving pressure in the distributor.

2. In a machine tool, the combination of a frame, a hydraulically and mechanically propelled work table movable along the frame, a cylinder, a fluid pressure operated piston in the cylinder and connected to the work table for moving with the table and relative thereto, hydraulically operated means for locking the piston against movement relative to the frame, a fluid distributor provided with fluid inlet and outlet openings and connected to said cylinder and to said hydraulically operated locking means, mechanically actuated means bearing upon the hydraulically locked piston for fine adjustment of the work table, manually actuated means for locking the work table to the frame, and a by-pass valve operatively connected to said manually actuated locking means whereby upon locking the work table said by-pass valve is positively opened to connect said inlet and outlet openings for relieving pressure in the distributor.

3. A machine tool having a work table, a fluid pressure motor including a cylinder, a piston rod connected to the work table for movement with the table and relative thereto, a locking cylinder traversed by the piston rod, fluid pressure operated means movable within the locking cylinder to apply locking pressure on the piston rod, valve mechanism controlling the flow of pressure fluid to and from both ends of the motor cylinder and to and from the locking cylinder, said valve mechanism being operative to supply pressure fluid to the locking cylinder while simultaneously relieving pressure from both ends of the motor cylinder and to supply pressure fluid to one end of the motor cylinder while simultaneously relieving pressure from the other end of the motor cylinder and from the locking cylinder, and mechanically actuated means bearing upon the locked piston rod for movement of the work table relative to the piston rod.

4. A machine tool comprising a work table, fluid pressure operated means for moving the work table, a manually operable valve controlling the supply and exhaust of fluid to and from said fluid pressure operated means, a fluid pressure operated locking mechanism controlled by said valve and acting to lock said fluid pressure operated means against movement upon the supply of fluid to said means being cut off, manually actuated means for locking the work table against movement, and means connected to said manually actuated means for relieving pressure from said fluid pressure operated means and from said fluid pressure operated locking mechanism upon manually locking the work table.

FERNAND TURRETTINI.